Figure 15:
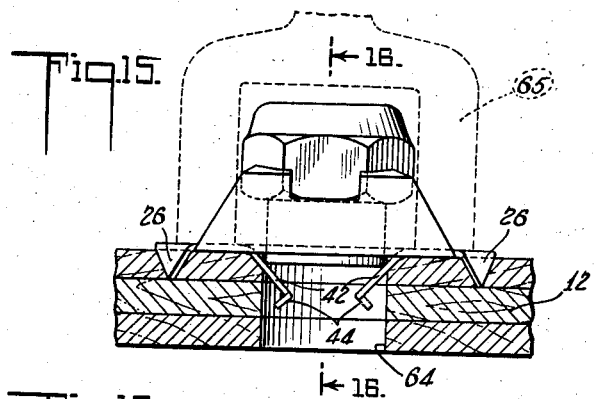

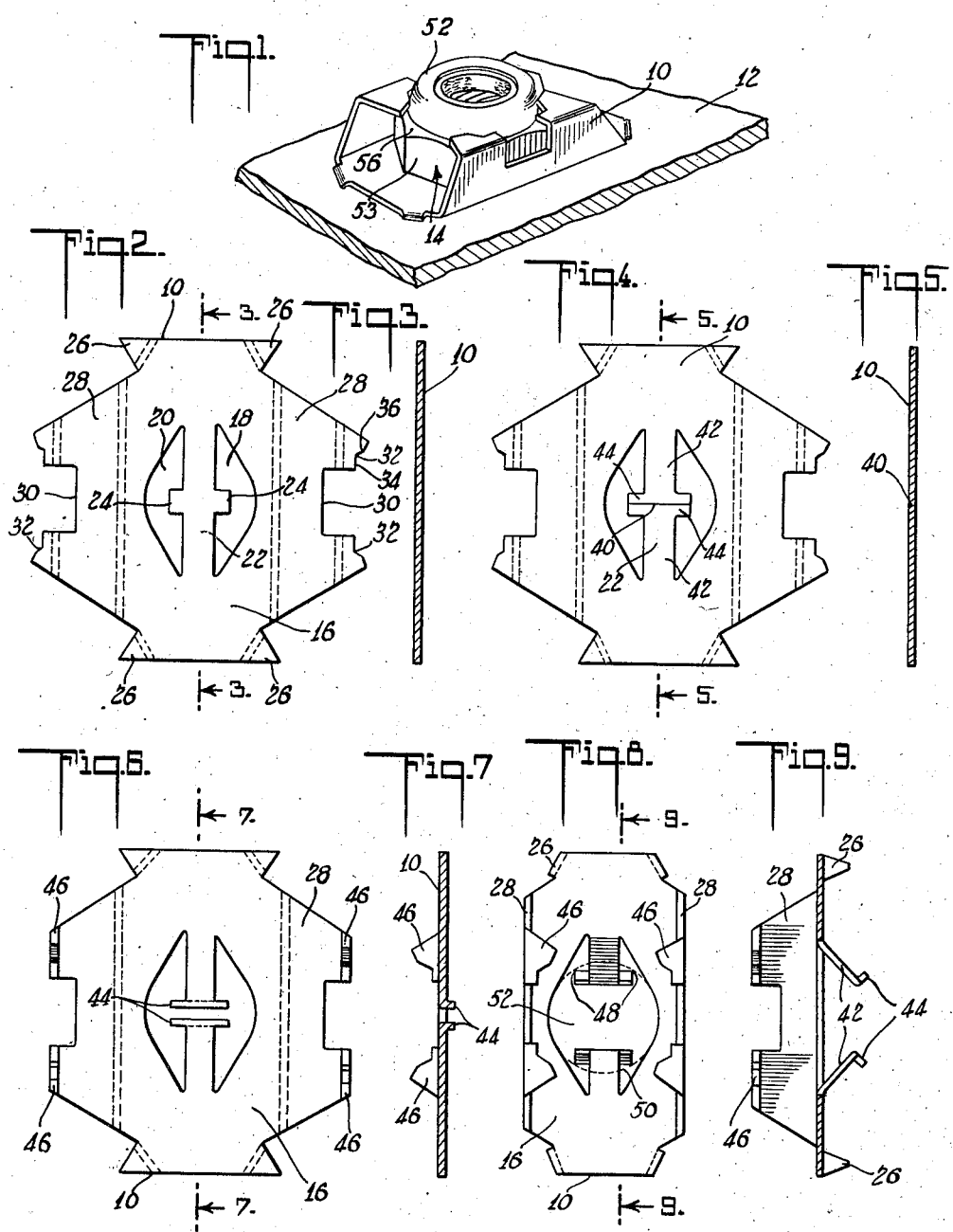

July 23, 1946.   R. L. HALLOCK   2,404,372
FASTENING DEVICE
Filed Aug. 13, 1943   8 Sheets-Sheet 2
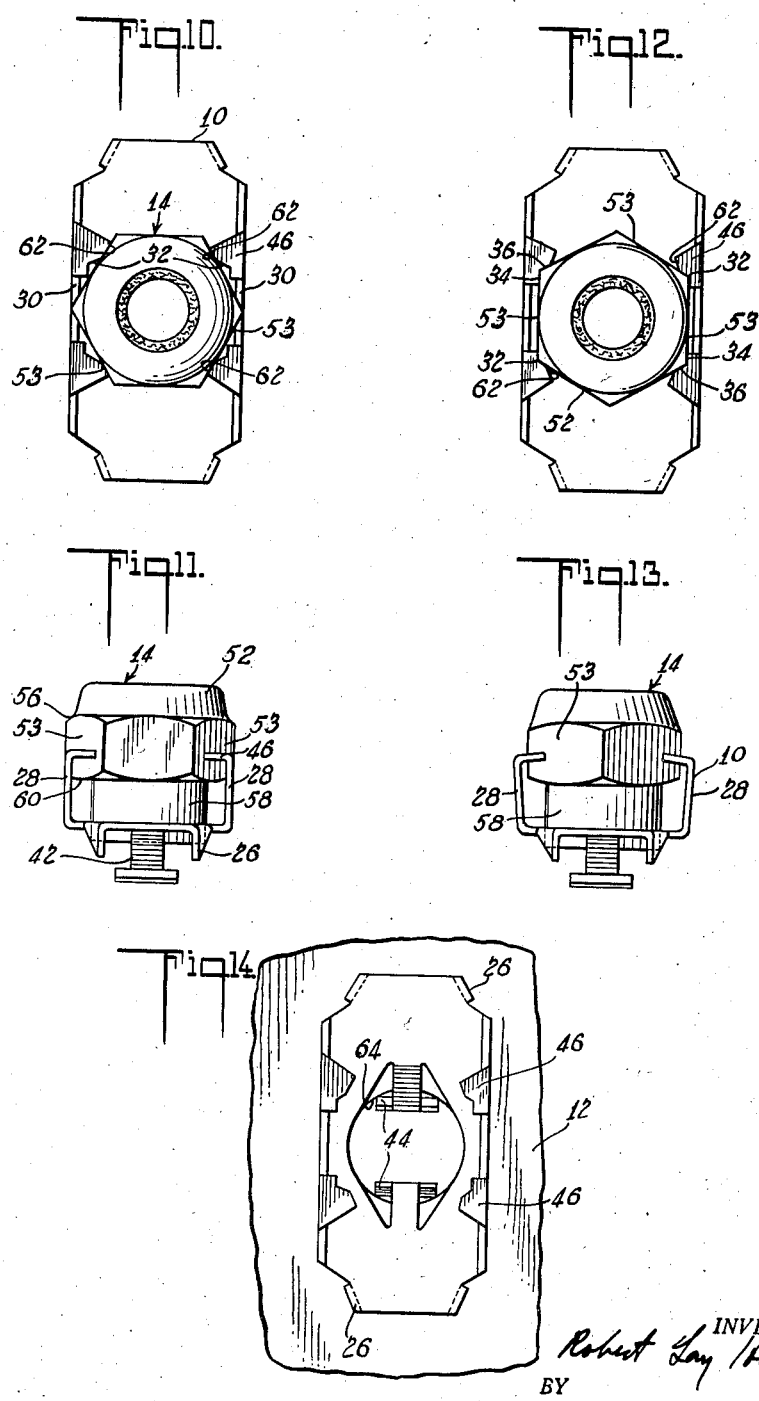

July 23, 1946.　　　R. L. HALLOCK　　　2,404,372
FASTENING DEVICE
Filed Aug. 13, 1943　　　8 Sheets-Sheet 3

INVENTOR.
Robert Jay Hallock
BY
Jarvis, Markle
his ATTORNEY

July 23, 1946.  R. L. HALLOCK  2,404,372
FASTENING DEVICE
Filed Aug. 13, 1943  8 Sheets-Sheet 4
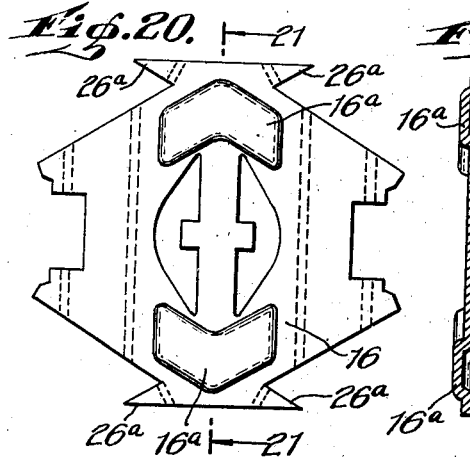
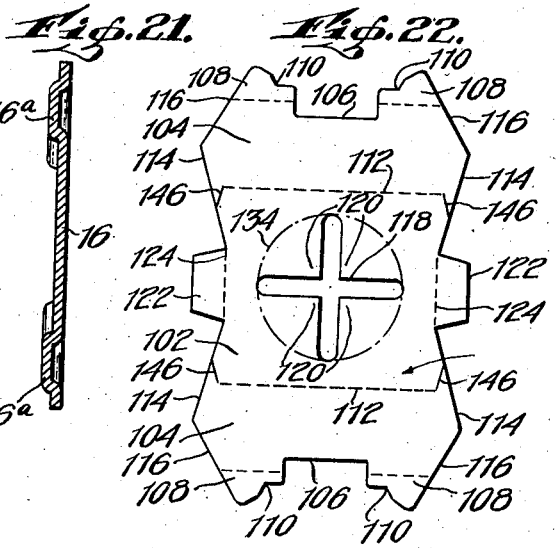
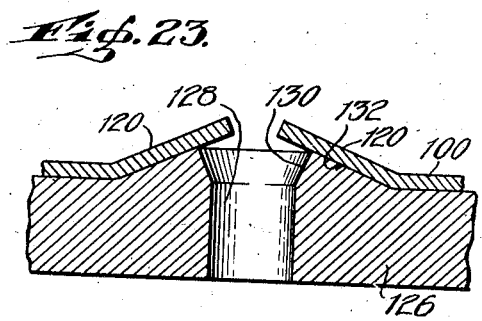
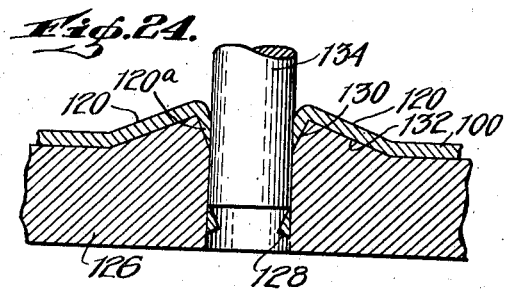
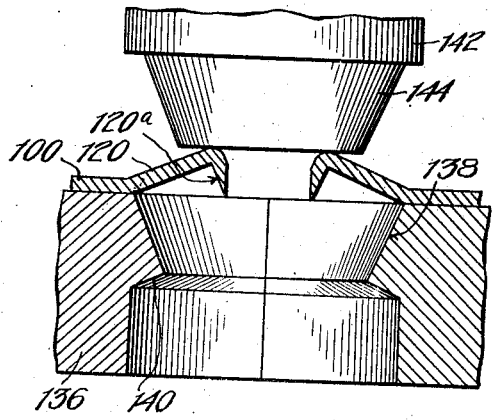
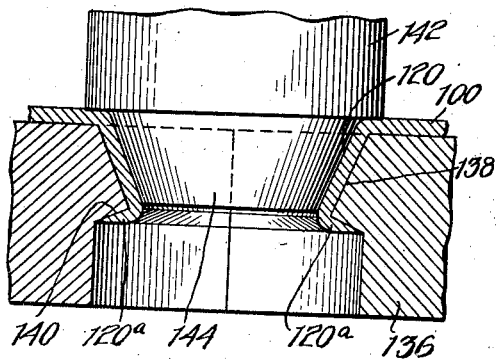
INVENTOR
Robert Jay Hallock
BY
James P. Marble
his ATTORNEY July 23, 1946.                R. L. HALLOCK                2,404,372
                            FASTENING DEVICE
                          Filed Aug. 13, 1943          8 Sheets-Sheet 5
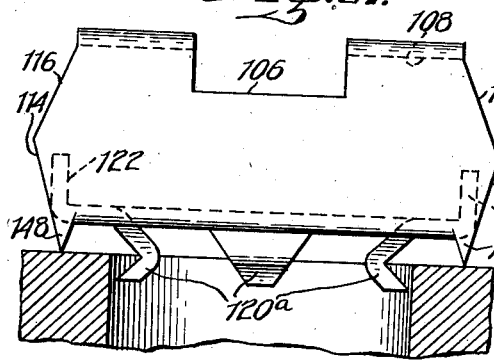
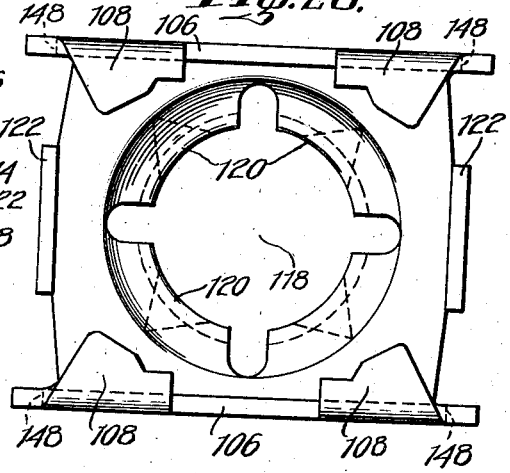
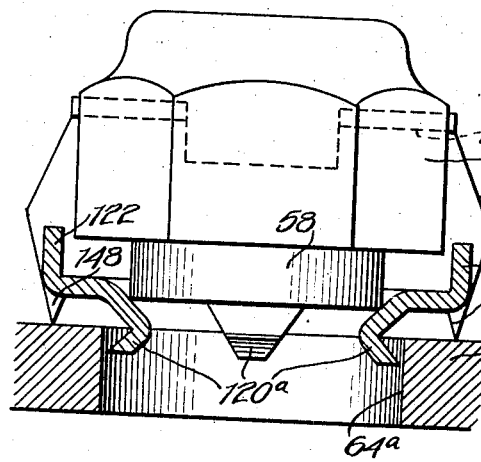
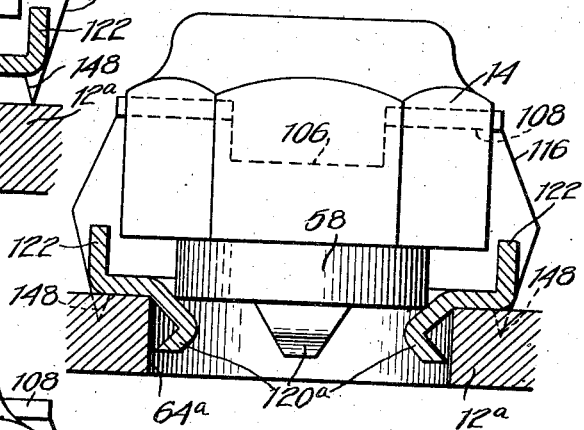
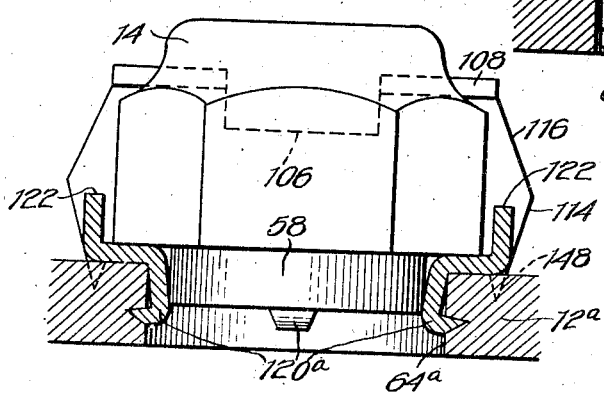
INVENTOR
Robert Lay Hallock
BY
his ATTORNEY July 23, 1946.                    R. L. HALLOCK                    2,404,372
                                 FASTENING DEVICE
                              Filed Aug. 13, 1943              8 Sheets-Sheet 6
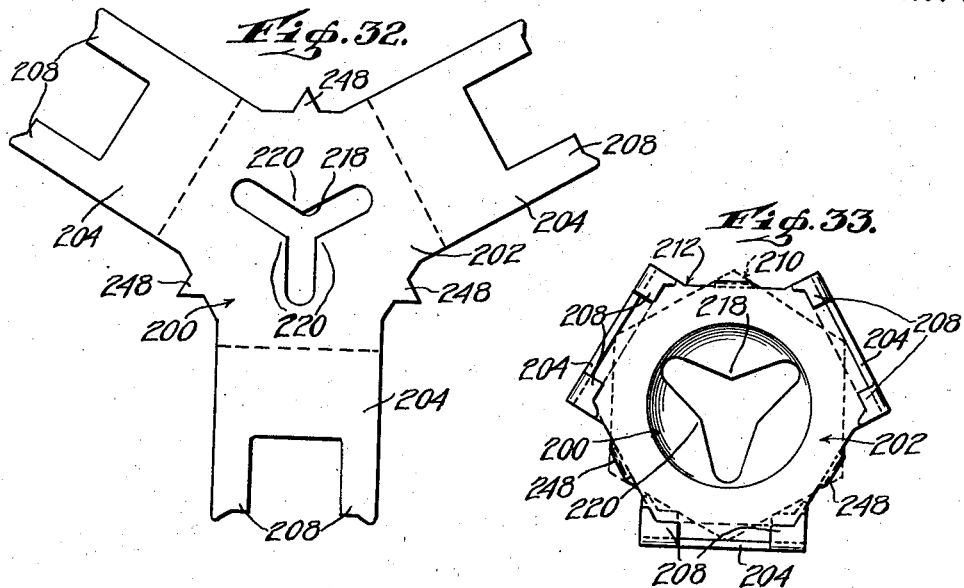
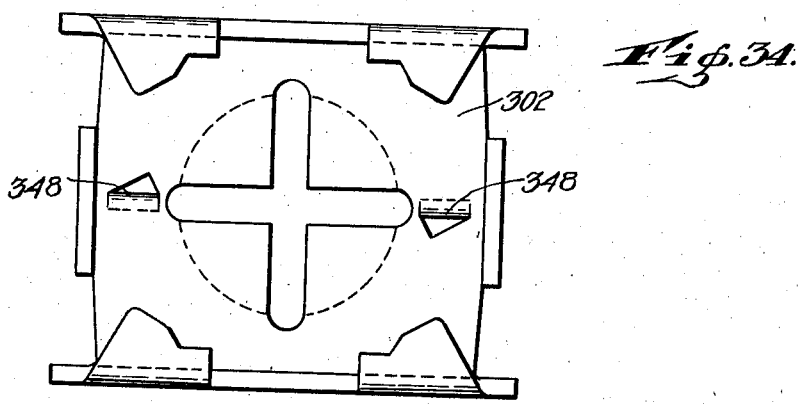
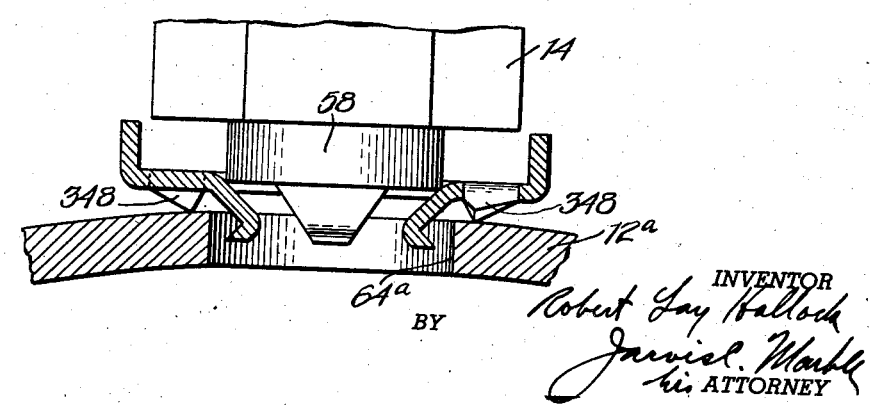
INVENTOR
Robert Jay Hallock
BY
his ATTORNEY

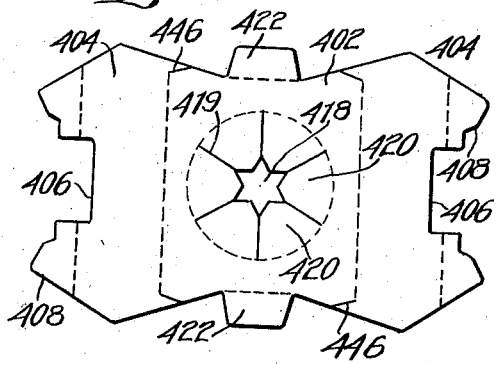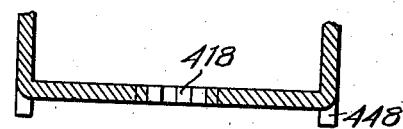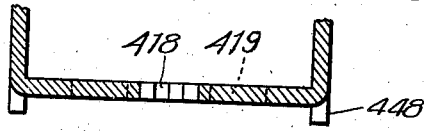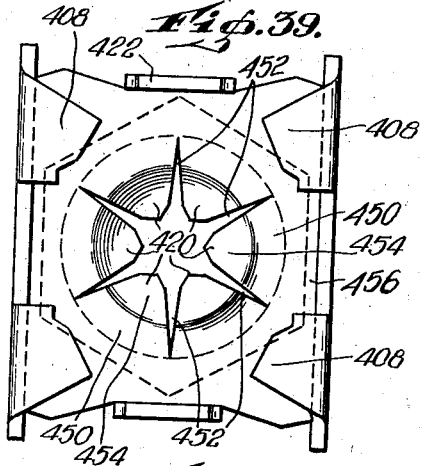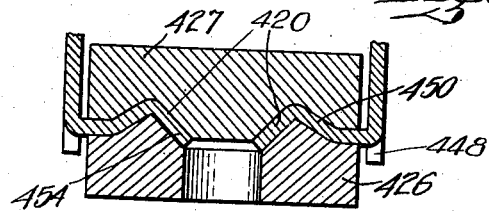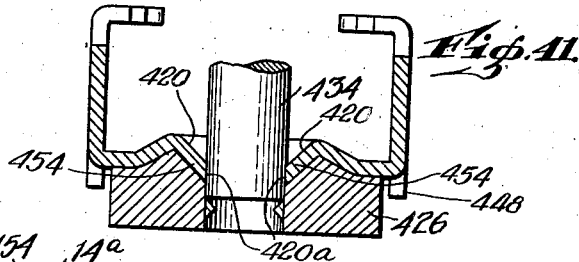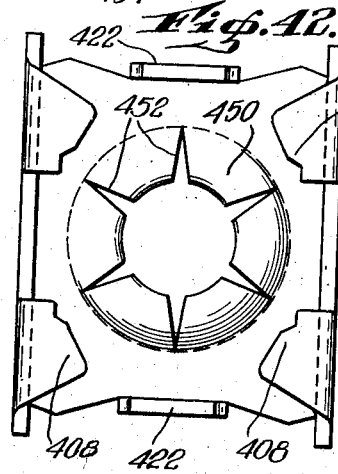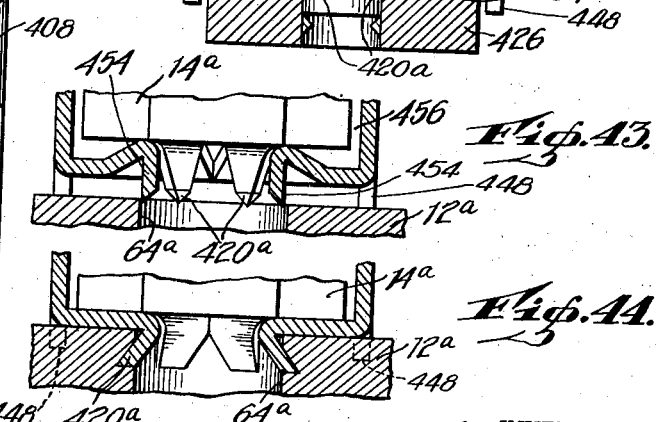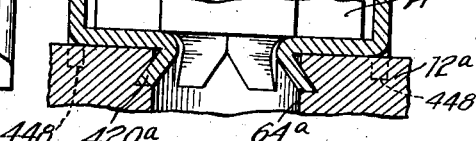

July 23, 1946.  R. L. HALLOCK  2,404,372
FASTENING DEVICE
Filed Aug. 13, 1943  8 Sheets-Sheet 8
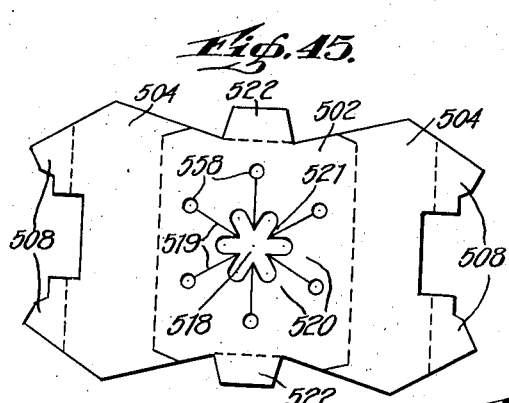
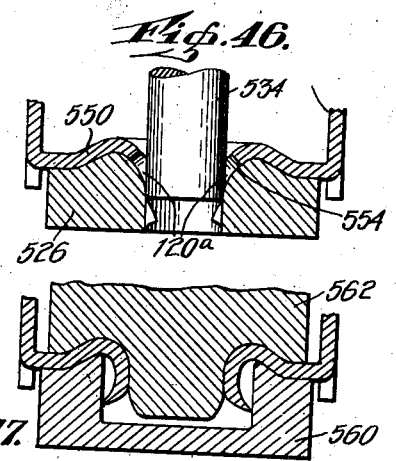
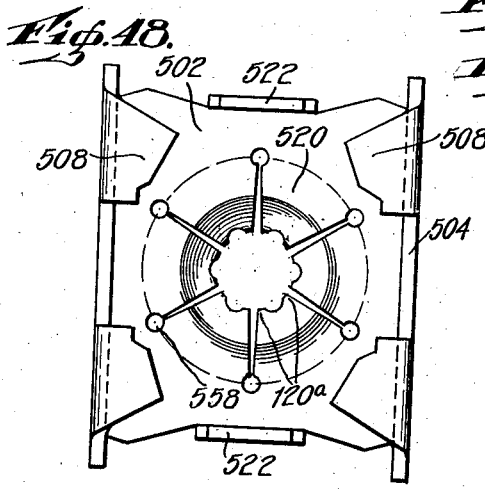
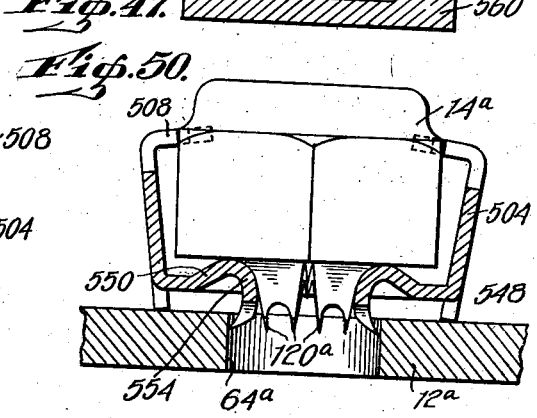
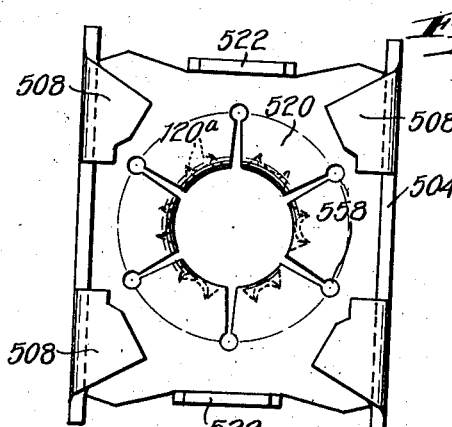
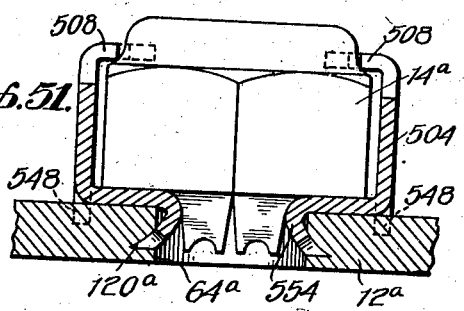
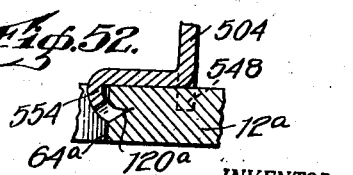
INVENTOR.
Robert Lay Hallock
BY
his Attorney Patented July 23, 1946

2,404,372

UNITED STATES PATENT OFFICE 2,404,372

FASTENING DEVICE

Robert Lay Hallock, Larchmont, N. Y., assignor to Elastic Stop Nut Corporation of America, Union, N. J., a corporation of New Jersey Application August 13, 1943, Serial No. 498,570

23 Claims. (Cl. 85—32)

This application is a continuation-in-part with respect to my copending application Serial No. 478,408, filed March 8, 1943, and as to subject matter common thereto constitutes a division thereof.

The present invention relates to fastening devices and more particularly relates to fastening devices for joining two or more bodies together by a screw threaded connection such as a bolt or screw and nut. Still more particularly the invention relates to such devices in which the fastening element, such as a nut, is to be held to a member made of softer material than that of the fastening device, as for example, plywood, plastic materials and the softer metals such as aluminum and magnesium and the alloys thereof, brass, etc.

The general object of the present invention is to provide a new and improved fastening device which may be firmly secured to a body of softer material, and which will hold securely with relation thereto a fastening element such as a nut against all normally encountered torque and thrust stresses that may be imposed thereon. To this end the invention contemplates the provision of an improved form of basket member which can be firmly secured to softer material, which will effectively hold against axial or rotative displacement a nut or the like when a screw or bolt is threaded therethrough, which is relatively light in weight, which will prior to installation firmly but removably grip the fastening element with which it is intended to coact to thereby provide a fastening assembly or unit which can be shipped and handled as such prior to installation, which is capable of being installed with or without the nut or fastening element being assembled therewith prior to installation, which will permit a defective fastening element to be removed after installation without permanent deformation of the basket so that a replacement fastening element can be installed, which can readily and cheaply be manufactured from sheet material with minimum waste thereof by mass production methods, which requires that only a single aperture be provided in the body to which it is to be attached, which can be securely attached to very thin plate structures as well as to heavier bodies, which occupies minimum space and which may readily be correctly installed by relatively inexperienced and unskilled labor with as little as a single installing operation requiring no special tool.

Figure 16:
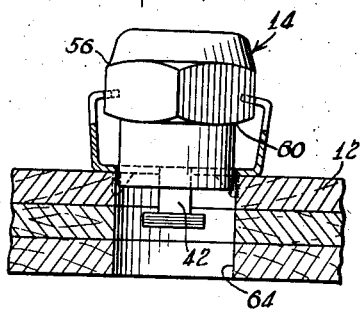
Figure 18:
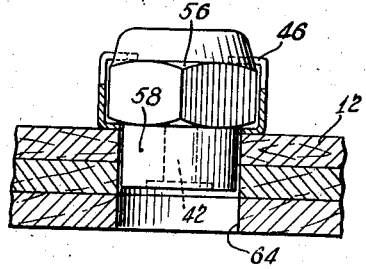
Figure 17:
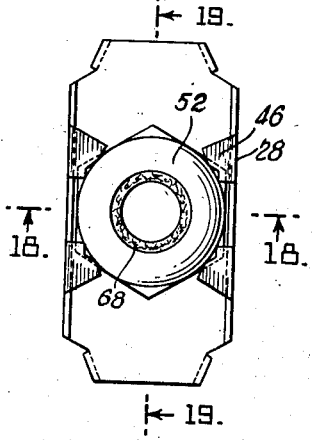
Figure 19:
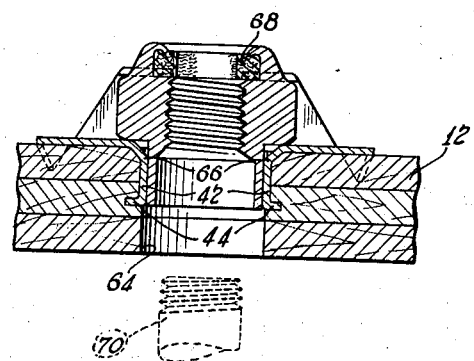

Further and more detailed aspects of the invention, together with the advantages to be derived from its use, will appear more fully from the ensuing portion of this description taken in conjunction with the accompanying drawings in which:

Fig. 1 is a perspective view of an installed fastening unit embodying the invention, Figs. 2 and 3 are plan and sectional views respectively of a stamping or blank for forming the basket member in accordance with a preferred method of manufacture, Figs. 4 and 5 are views corresponding to Figs. 2 and 3 respectively showing the blank after a second blanking operation, Figs. 6 and 7 are views corresponding to Figs. 2 and 3 respectively showing the blank after a first forming operation, Figs. 8 and 9 are views corresponding to Figs. 2 and 3 respectively showing the blank after a second and final forming operation, Figs. 10 and 11 are plan and end views respectively of a fastening unit comprising a basket member and nut, with the nut in a preliminary assembled position in the basket, Figs. 12 and 13 are views corresponding respectively to Figs. 10 and 11 showing the nut turned in the basket to an intermediate assembled position, Fig. 14 is a plan view showing the basket positioned over an aperture in a body to which it is to be secured, Fig. 15 is a side view showing the unit after a preliminary setting operation, Fig. 16 is an end view, partly in section, of the structure shown in Fig. 15, Figs. 17 and 18 are top and end views respectively of the unit after the final setting operation, Fig. 19 is a section taken on the line 19—19 of Fig. 17, Figs. 20 and 21 are views similar to Figs. 2 and 3 respectively, showing a different form of blank, Fig. 22 is a view of a blank for forming a basket adapted to be attached to metal bodies, particularly thin metal sheets, Figs. 23 through 26 are fragmentary sectional views showing a method of shaping certain parts of the blank shown in Fig. 22, Figs. 27 and 28 are elevation and plan views respectively of the basket formed from the blank shown in Fig. 22, Figs. 29 through 31 are views showing the installation of a unit including the basket shown in Figs. 27 and 28, Fig. 32 is a view of a blank for forming a different embodiment of basket, Fig. 33 is a plan view of a basket formed from the blank of Fig. 32, Fig. 34 is a plan view of another form of basket, Fig. 35 is a fragmentary sectional view of a unit embodying the basket shown in Fig. 34, Fig. 36 is a plan view of a blank for still another form of a basket, Fig. 37 is a sectional view of the blank after certain forming operations thereon, Fig. 38 is a view similar to Fig. 37 showing the blank after a further shearing operation, Fig. 39 is a top plan view of the basket in a semi-formed stage, Figs. 40 and 41 are sections showing a method of forming the hooks as shown in Fig. 39, Fig. 42 is a view similar to Fig. 39 showing the completed basket, Fig. 43 is a fragmentary section showing the unit comprising the basket and a skirtless nut ready to be installed, Fig. 44 is a view similar to Fig. 43 showing the unit installed, Fig. 45 is a plan view of a blank of still another embodiment of basket member, Figs. 46 and 47 are fragmentary sections showing a method of forming hooks from the blank shown in Fig. 45, Figs. 48 and 49 are plan views of the basket member with the hooks as shown in Figs. 46 and 47 respectively, Figs. 50 and 51 are views of a unit comprising basket member and nut in positions ready for installation and installed, respectively, and Fig. 52 is a fragmentary view illustrative of a different final position assumed by feet of the kind shown in Figs. 45 to 51.

Fig. 1 shows in elevation and in installed position one form of fastening device embodying the invention and of a type adapted to be secured to a body of relatively thick material. This device comprises an anchoring or basket member 10 secured to a sheet 12 of plywood or other material softer than that of the member 10 and holding in operative position a hexagonal nut 14 through which a bolt or screw is to be threaded from below the sheet 12 through a suitable aperture therein. While in the illustrated example the nut, which will be described more in detail later, has a hexagonal body, it will be understood that this specific shape of nut is shown and described herein only by way of example and that the principles of the invention may equally well be applied to other specific shapes of nuts or equivalent fastening elements.

The basket member 10 is made from sheet metal and is formed by a series of blanking and forming operations which will now be described with reference to the production of a basket member suitable for use with a hexagonal nut of the kind shown in Fig. 1.

In the first operation member 10 is blanked out from sheet material to have the form shown in Figs. 2 and 3. In this form the blank has a central base portion 16 in the central part of which two elongated openings 18 and 20 are formed and between which there is left a bridge or web 22 from the opposite sides of which project lugs 24. At the corners of the base portion 16, triangular points, or prongs, 26 are formed. Along the major sides of the central portion, laterally extending wings 28 are provided, each having a rectangular notch 30 located centrally at its outer edge. The material at each side of each of the notches 30 is further notched as at 32 and, as will be noted from Fig. 2, the sides 34 of notches 32 are parallel to the major axis of the member while the included angle between sides 34 and sides 36 of each notch 32 is approximately 120 degrees. The reason for this configuration will appear later.

The blank above described is then subjected to a shearing operation for transversely parting the bridge 22 along the line 40 to provide two separate legs 42, the free ends of which terminate in transversely extending feet 44. If desired in the blanking operations the blank 10 may be scored along lines indicated by the dotted lines in Figs. 2 and 4 to aid in the subsequent bending effected by the forming operations.

In the first forming operation the blank is shaped to the form shown in Figs. 6 and 7, the portions to each side of the notches 30 being bent up at right angles to the plane of the base portion of the blank to form fingers 46 while the feet 44 are bent downwardly substantially at right angles to the plane of the base as shown more clearly in Fig. 7.

In a succeeding forming operation the wings 28 are bent upwardly to positions substantially at right angles to the base portion, as shown in Figs. 8 and 9, thus bringing fingers 46 into opposed confronting relation with the notches 32 facing each other, the wings with their associated fingers providing what may be termed re-entrant confronting arms. In the same operation the prongs 26 are bent downwardly at right angles to the plane of the base and the legs 42 are also bent downwardly but only to an inclined position as shown more clearly in Fig. 9. The legs 42 with their feet 44 provide what may be termed hooks and for reasons which will hereinafter more fully appear these portions preferably are bent downwardly to positions such that the outer corners 48 of the feet 42 are tangent to a circle indicated by the dotted line 50 which coincides with the curved outer walls of the openings 18 and 20 which have now been merged to provide a central aperture 52.

The basket member in the form shown in Figs. 8 and 9 is ready for assembly with the fastening element with which it is to cooperate, which in the present instance is the hexagonal nut 14 which as shown in Figs. 10 and 11 comprises a main hexagonal body portion having the wrench engaging faces or flats 53 and a circular upper portion or rim 54, these two portions being joined by a chamfered face 56. An annular skirt 58 depends around the bore of the nut from the base face 60.

In order to effect preliminary assembly of the nut and basket member the nut is first placed in the basket in the position shown in Figs. 10 and 11. In this position two diametrically opposed edges of the hexagonal portion of the nut project into the recesses 30 in the arms of the basket member and the adjacent flats 53 bear against faces 62 formed on fingers 46 adjacent to the notches 32. As will be observed from Fig. 10 the diametrically opposed edges of the nut overlie the recesses 30 so that the extent to which the nut can be pushed downwardly into the basket is limited by abutment of base 60 of the nut against the bottom of these recesses. The length of the flange 58 is made such that when the nut is pushed downwardly as far as it will go when in the position relative to the basket member shown in Fig. 10, the flange will project through the central aperture 52 in the base portion, as will be seen in Fig. 11, but will not project sufficiently to further bend outwardly the depending legs 42. In the position of the parts shown in Figs. 10 and 11 the nut will be properly centered in the basket but may be in this position with a relatively loose fit, although if desired there may be some measure of frictional contact between the sides of the nut and the fingers. It is to be noted that in this position of the parts the arms 28 are substantially unflexed.

The position of the parts shown in Figs. 10 and 11 is what may be termed a preliminarily assembled position from which the nut is moved to an intermediate position of assembly which operates to make of the two parts a single unit frictionally held together with sufficient force to constitute a unitary structure for handling, shipping and installing purposes but still requiring further change of position of the parts relative to each other to a finally assembled position when the unit is installed. As will be seen from Fig. 11, the position of the nut in the preliminarily assembled position is such that portions of the flats extend above the fingers 46 and with the nut in this position the flats are engaged by a wrench or any other suitable tool and turned relative to the basket to the position shown in Figs. 12 and 13. In this position, edges between adjacent flats 53 are forced into the notches 32 of the fingers 46 and portions of the flats are engaged by the sides 34 and 36 of the notches. It will be apparent from a consideration of Figs. 10 and 12 that for this to be effected the arms 28 will have to be sprung outwardly as shown in Fig. 13, this being accomplished by what amounts to cam action by the flats of the nut when the latter is turned. As previously noted, the angle between the sides 34 and 36 of the notches is 120 degrees so that for a hexagonal nut the sides of the notches will solidly engage the flats. Obviously, if the portion of the nut to be gripped is of different configuration, the notches in the fingers 36 should be shaped accordingly.

With the parts in the position relative to each other shown in Figs. 12 and 13, the nut is tightly gripped frictionally by the flexed arms 28, and due to the fact that the notches in the fingers engage the different faces of the nut and the fact that the skirt or shank 58 of the nut is located in the central aperture 52 of the base portion of the basket, the nut is evidently securely held in the basket not only against removal therefrom in ordinary handling but also against "cocking" in the basket. At the same time the assembly is not of a permanent nature to the extent that either one of the parts needs to be permanently deformed in order to effect disassembly, so that if, for example, it were found after assembly of a unit that either one of the parts were defective the two parts could readily be separated and the good part reassembled with a part replacing the defective one.

The unit as above described is ready for attachment to an apertured body of plywood or other material softer than the metal of the basket such as the sheet 12 which, as indicated in Fig. 15, is provided with an aperture 64 the diameter of which is preferably substantially the same, but with a slight clearance, as the diameter of the skirt 58 of the nut. In securing the unit to the sheet, the basket is placed over the aperture with the legs 42 projecting into the aperture and from Fig. 14 the utility of bending these legs downwardly to a position such that the corners of the feet 44 assume a predetermined position relative to the basket will be apparent. From this figure it will be seen that with the feet positioned as described they will act as centering members for exactly centering the basket over the aperture in the sheet before the prongs 26 make contact with the surface of the sheet. After the basket has been placed over the aperture and centered by means of the feet it is then preliminarily fixed to the surfaces of the sheet by a blow or pressure which operates to embed the prongs 26 in the material of the sheet as shown in Figs. 15 and 16. This may be accomplished with any suitable form of forked tool such as that indicated by dotted lines 65 in Fig. 15 which will bridge the nut and bear against the exposed end portions of the central base of the basket.

With the basket seated flush against the surface of the sheet, the final installing operation, which operates to lock the basket to the sheet and which also operates to move the parts of the unit to finally assembled and substantially locked position, is effected by a blow on the top of the nut or other pressure which will operate to force the nut downwardly into the basket until the base face 60 seats against the central base portion of the basket. This movement effects two things simultaneously. When the nut is moved from the position shown in Fig. 16 to the position shown in Fig. 18 the flange 58 of the nut acts to embed the hooks formed by the legs 42 and feet 44 into the side wall of the aperture 64, thus locking the basket against removal axially from the sheet unless the hooks are torn forcibly through the material of the sheet. At the same time the downward movement of the nut moves the chamfer 56 to a position below the level of fingers 46 and these fingers snap over this chamfer to engage the circular portion 54 of the nut as shown in Figs 17 and 18. As will be more clearly seen from Fig. 17 the fingers in moving to this position move so as to overlie the hexagonal portion of the body of the nut and hold it against axial displacement from the basket under the influence of any normal force likely to be exerted against the nut in a direction tending to force it out of the basket. The flats, lying between the wings 28, serve to prevent rotation of the nut in the basket.

As will be observed from Fig. 19, the legs 42 are bent on a substantial radius as indicated at 66 and it is in order to effect this that the openings 18 and 20 shown in Fig. 2 are made elongated rather than half-circular in form so that the legs will be bent initially from a position outside the radius of the circle 50 (Fig. 8). By bending these legs on an appreciable radius, any tendency of the base portion of the basket to distort or bulge is avoided and a further embedding of the hooks in the side wall of the aperture 64 is effected.

In the device illustrated the nut shown is of a known self-locking type in which a locking insert 68 of fibre or other elastic material is carried in the nut body for engagement with the threads of a bolt or screw threaded through the nut from the underside of the sheet 12. In any such installation the normal forces acting on the unit will be axially downward as viewed in Fig. 19 and the substantial area of the base portion of the basket affords means for distributing the load over an appreciable area of the surface of the sheet 12, thus minimizing the possibility of pulling the unit through the sheet even if the latter is of relatively weak material. The unit will also be subject to certain torque forces and effective resistance to these forces is effected, even though the material of the sheet is relatively soft, by means of the prongs 26 which are located at a substantial radius from the axis of the nut. These prongs or their equivalent are not in all cases essential, however, since the extent to which the hooks are embedded in the wall of the aperture 64 is considerable and if the material of the sheet has any great degree of density and strength the hooks themselves may well be ample to keep the unit from turning under the influence of any torque likely to be applied to it in normal service.

While in its finally installed position the unit constitutes a substantially locked assembly, it is possible to remove the nut from the basket for replacement without injury to the basket. Such removal can be effected by a combination of torque and axial thrust applied to the nut upwardly and away from the basket, as for example, by a threaded bolt such as is indicated at 70. If this bolt is screwed upwardly into the nut until the end of the thread is reached and is then simultaneously twisted and forced upwardly the cam action of the flats of the nut plus the axial force exerted on the under sides of the gripping fingers can be made to force the resilient arms 28 outwardly to permit the nut to assume its position of preliminary assembled relation to the basket as shown in Figs. 10 and 11. From this position the nut can readily be withdrawn from the basket. Likewise the nut can be removed by a similar combination of torque and axial force by screwing a bolt into the nut from the top to a point where the thread end is reached so that torque and axial pull from above can be applied to the nut. Replacement of a removed nut from an installed basket is effected in the same way as previously described in connection with the assembly of an uninstalled unit. While the unit might be removed by a strong axially applied force alone, as by a blow, this is not desirable since without the cam action on the arms produced by torque and tending to spread them, the fingers might be permanently deformed by the nut.

While, as previously described, the unit may readily be installed by use of a forked tool for setting the basket and thereafter by directly striking the nut with a hammer or the like, it may be desirable in some instances, depending upon the nature of the nut or other fastening element secured in the basket to employ a special installing tool.

A special tool suitable for this purpose is disclosed in and forms a part of the claimed subject matter of my aforesaid application, Serial No. 478,408, of which this is a continuation-in-part.

I have found that for many kinds of installations, the force required to bend the depending hooks outwardly toward their installed position, which force is exerted by the nut before it can move from its intermediate assembled position (Figs. 15, 16), is capable of producing a downward axial thrust on the basket member, when downward force is exerted on the nut, sufficient to cause the corner prongs to penetrate the material to which the basket member is attached before relative movement between the nut and basket member operates to spread the hooks and lock the unit in place. Thus it is possible in many instances to effect installation by a single operation, such as a hammer blow or pressure exerted on the nut or even by screwing a threaded member into the nut and drawing the unit home by axial force exerted on the nut from the member screwed into it.

When it is desired to provide a unit that is particularly adapted to be secured to relatively dense material by a single operation the basket member is advantageously provided with relatively very sharp prongs to facilitate penetration and the central base portion is also preferably provided with reenforcing ribs or other projections to avoid possible distortion of the base when the force required to embed the prongs is transmitted to the basket from the nut, rather than directly from an installing tool as shown in Fig. 15.

In Figs. 20 and 21 there is illustrated a form of blank suitable for single operation installation, the prongs 26a in this instance being relatively sharper than the prongs 26 shown in Fig. 2. I have found that prongs having an included angle of about 30° will readily penetrate most materials softer than themselves due to axial force applied to the basket by the skirt of the nut bearing on the legs of the basket, and will also provide adequate holding power against rotational displacement of the unit. In the present form, the flat base portion 16 of the blank for the basket member is also deformed to provide reenforcing or stiffening projections or ribs 16a. These latter are readily formed by suitably shaped blanking dies so that no additional manufacturing operations are required. It will be evident that, starting with a blank as shown in Figs. 20 and 21, the subsequent shaping and assembling operations may be as previously described and a description thereof therefore need not be repeated. Installation of the unit, however, may be made by a single operation in relatively dense material. It is also to be noted that if the material to which the device is to be attached is relatively soft, the form shown in Fig. 1 and related figures is capable of being installed by a single operation.

The forms of the device previously described are intended primarily for installation on bodies of relatively thick material (as distinguished from thin metal plates) which is relatively soft, such for example as plywood or plastic. There are, however, many cases where nuts are required to be attached to thin metal sheets such as instrument panels and the thin metal skin or other parts of aircraft. Heretofore such installations have been made by forming the nut body with one or more thin lugs or tabs projecting laterally from the base, to provide a so called "anchor nut" the tab or tabs of which are either riveted or welded to the metal sheet to which the nut is attached. Such installations involve a multiplicity of operations and in the case of riveted anchor nuts, require the making of accurately located rivet holes. Moreover, the necessary lateral extent of the tabs often makes installation of an anchor nut difficult if not impossible where space limitations require a small size unit.

The principles of the present invention are readily applicable to the production of a device capable of being attached to metal bodies, inclusive of thin plates, of aluminum or other metal softer than that of which the basket member is made, and in Figs. 22 to 28, there is illustrated one form of device suitable for this purpose.

As shown in Fig. 22, the blank 100, advantageously of steel or metal having equivalent physical properties of hardness and resiliency, is cut to provide a central base portion 102 and opposed wing portions 104, recessed respectively at 106 to provide fingers 108. The fingers are notched at 110, the form of the recesses and notches in the wings being as previously described. In the present case the wings are to be bent up respectively along the lines 112 and it will be observed that the end edges of the wings are shaped somewhat differently than the corresponding edges in the previously described form.

In this instance the edges diverge from the line of bending to a place intermediate the height of the wing, as at 114. The edges of the outer parts of the wings converge, as at 116. The reason for this configuration will later be explained.

In the center of the base portion the blank is cut to provide an aperture 118 in the form of a cross, resulting in the formation of four triangular tabs 120, for formation into pointed hooks.

The ends of the blank are cut to form oppositely projecting relatively short and blunt tabs 122, adapted to be bent respectively along the lines 124.

Preferably, although not necessarily, the pointed hooks are formed to shape from the tabs 120 before the wings and the end tabs are bent to shape, and one suitable way of forming the hooks is shown in Figs. 23 to 26. Referring to these figures, 126 represents a die having a bore 128 flared at its upper end by a countersink 130. The upper surface of the die adjacent to the bore is frusto-conical having a surface 132 meeting the countersink surface 130 preferably at right angles as shown. The blank 100 is first forced down on the die by a suitable punch (not shown) to bend the tabs 120 upwardly as shown in Fig. 23 and then a circular punch 134 is forced into the bore 128 of the die (Fig. 24) to bend the tips of the tabs 120 down against the countersink surface 130 and also shear the tips to form sharply pointed feet 120a. With the feet thus formed, the blank is placed over a sectional or split die 136 (Fig. 25) having a bore the upper portion 138 of which is conical and which is conically undercut or counterbored at 140. A punch 142 having a frusto-conical nose 144 is then forced into the bore to bend the tabs down to form hooks having sharply pointed outturned feet 120a as seen in Fig. 26.

Figs. 27 and 28 show the blank bent to form the retaining arms from the wings 104, the finger portions 108 first being bent up and the wings then being bent up along lines 112, as previously described. In the present instance, however, the dies and punches for bending the material along these lines are made so that the material is sheared along the lines 146, shown in Fig. 22, to provide sharp prongs 148 which project downwardly from the plane of the base portion of the basket. These prongs, as will be observed from Figs. 27 and 28, are in effect continuations of the upright or side wall portions of the retaining arms of the basket. The metal at the base of the prongs is not bent or otherwise severely stressed by this operation and due to the diverging end edges 114 of these wall portions the prongs are solidly backed up by the relatively rigid side walls and have, therefore, relatively great penetrating power without bending or breaking, in spite of their comparatively small section. The tabs 122 at the ends of the blank are also bent up as shown in Figs. 27 and 28.

In Figs. 29 to 31 is shown the manner in which the device just described is installed by a single operation, the hooks having the feet 120a being shown rotated at 45° out of their true position for clarity of illustration. Fig. 29 shows the unit of basket member and nut ready to be attached to a thin metal sheet 12a having an aperture 64a the diameter of which is only slightly greater than the distance across the points of opposite feet 120a, so that the latter can function to center the unit while at the same time having clearance to move freely into the aperture. With the unit placed as shown in Fig. 29, the nut is then for example struck with a hammer, the force of the blow operating to move the unit to the position shown in Fig. 30 without relative movement between the nut and the basket. The reason why the initial action is like this is because, due to the conical form of the hooks formed from the tabs 120 and bearing the feet 120a, these hooks are relatively rigid and require a greater axial force to be imposed on them by the skirt 58 of the nut 14 before bending outwardly than is required to make the prongs 148 penetrate the surface of the metal sheet. Following this initial action, which operates to seat the base of the basket on the surface of the sheet, the force of the blow, resisted by the now firmly supported basket, moves the nut relative to the latter and spreads the hooks so that the feet 120a penetrate the wall of the aperture 64a as shown in Fig. 31.

This movement also causes the fingers 108 to snap over the top of the nut and as previously pointed out, a combination of torque and thrust on the nut enables it to be snapped out of the basket. In this connection it is to be noted that once the basket is attached, the hooks, the feet of which are embedded in the aperture in the sheet, are sufficiently strong to hold the basket attached to the plate without the skirt 58 of a skirted nut of the kind used to apply the basket. Consequently, if after installation the original nut becomes defective for any reason, it can be replaced by a standard skirtless nut, which is of substantial advantage in the field where special nuts may not be available. It is for this reason that the end tabs 122 are preferably provided in order to act as guides to prevent the "cocking" of standard nuts, which lack the skirt that in itself acts as a guide.

In all of the previously described forms of basket member, two parallel and directly opposed nut holding arms have been provided. This arrangement may, however, be varied and since six sided or "hex" nuts are most commonly used, there is shown in Figs. 32 and 33 another form of basket particularly suited for such nuts. In this the blank 200 for the basket has a central base portion 202 from which three projecting wings 204 are formed, these wings being recessed to provide notched fingers 208 of the kind previously described. The wings are bent up to form arms having inturned confronting fingers of the kind previously described, between which a hex nut is inserted in the position shown by the dotted line outline 210 in Fig. 33, the nut subsequently being turned to the gripped position shown by the full line 212. In the example shown, the blank is provided with a central aperture 218 forming three tabs 220 for formation into hooks of the kind described in conection with Figs. 23 to 26. For assisting in holding the basket against rotation, prongs 248 are formed to be bent down for penetration into the surface of the body to which the basket is to be attached. Otherwise, the features of this form of basket and its manner of cooperation with a nut are as previously described and need not be repeated in detail.

In some cases it may be desirable to fix the basket to a convex rather than a flat surface and for such applications it may be advantageous to locate the rotation resisting prongs so that they penetrate close to the perimeter of the aperture in the sheet to which the basket is fixed. A form of basket with prongs located close to the aperture engaging hooks is shown in Figs. 34 and 35. In this basket the base portion 302 is sheared to provide triangular prongs 348 bent down to penetrate the surface of the plate 12a adjacent the aperture 64a. In this instance the plate 12a has been shown convexly curved, and from Fig. 35 it will be apparent that prongs located some distance radially away from the aperture would not fully penetrate the surface, if at all.

It will of course be evident that the feet 120a, embedded in the wall of the aperture, will resist rotational as well as axial displacement, and the resistance against rotational displacement may be enhanced by shaping the tabs 120 when they are bent so that the side edges of the hooks formed from these tabs, as well as the feet 120a, are bent outwardly to penetrate the wall of the aperture. It is to be noted in this connection, however, that for securing the basket to flat sheets, the use of prongs located some distance from the aperture is usually preferable because of the greater moment arm obtained for resisting torque tending to turn the basket. If the material of the sheet is relatively soft, prongs located very close to the aperture, or hooks specially shaped to resist torque as well as axial thrust, may tear the material of the sheet when prongs located further from the aperture would hold without tearing under the same torsional stress.

All of the several forms of basket hereinbefore described are adapted for use with skirted nuts. This does not require the production of "special" nuts, since skirted nuts, known in the trade as "clinch" nuts, are used in large quantities and are readily available. However, the invention is applicable to the production of baskets cooperable with standard skirtless nuts to provide units capable of being applied in the same manner as already described, and in Figs. 36 through 44 this type of unit and its application is shown. As will be seen from Fig. 36, the blank is of the general form previously described having a central base portion 402 with oppositely disposed wings 404 and recessed at 406 to provide the notched fingers 408. The blank is also formed with the end tabs 422 and is sheared at 446 to provide for the prongs 448.

In this instance this portion of the blank is provided with a star-shaped aperture 418 from the points of which radial slits 419 are sheared by a second operation, so as to provide six tabs 420. By means of a suitable die 426 and cooperating punch 427, the tabs 420 are bent as indicated in Figs. 39 and 40 to provide upwardly bent portions at the bases of the tabs which in effect form a frusto-conical surface 450 interrupted by the slots 452 resulting from the spreading of the slits 419. The tip ends of the tabs 420 are bent downwardly to form the leg portions 454 of the hooks and as seen in Fig. 41 the tips are sharpened into pointed feet 420a by means of a punch 434 cooperating with the die 426. After these pointed feet have been formed, the leg portions 454 are bent down so as to depend vertically as shown in Figs. 42 and 43. It will be understood that by suitable bending operations the wings of the blank are bent to provide the nut retaining arms and fingers as previously described.

In Fig. 43, the basket is shown located over a plate 12a having an aperture 64a ready to be installed by the action of a skirtless nut 14a which is in assembled position in the basket, as previously described, with the base of the nut resting on the uppermost portions of the bent tabs.

In Fig. 44, the unit is shown in installed position, installation having for example been effected by a blow on the top of the nut which operates to seat the basket on the plate 12a by causing penetration of the prongs 448 and which also, by flattening the frusto-conical ring portion 450, operates to cause the feet 420a to penetrate the walls of the aperture 64a. As will be observed from Fig. 43 the pointed feet have what may be said to be a sharp spade-like configuration and as they are bent outwardly to engage the wall of the aperture the bevelled faces of the feet assist in causing the feet to dig into the wall of the aperture. It is to be noted in this connection, however, that the curvature of the legs 454 which gives them a conical form makes these parts relatively quite rigid so that they have ample strength to force the feet into the wall of the aperture.

In this form of the device, the hooks engaging the wall of the aperture are not backed up in their spread position by a skirt on the nut but it has been found that the strength of hooks of the kind illustrated is ample to prevent them from bending under the influence of any axial force that normally would be encountered tending to pull or push the basket away from the surface of the plate. The strength of these hooks is such that under excessive axial thrust they will tear through the metal of a softer plate before bending out of their embedded positions.

In the previously described embodiments the skirt on the nut, after the unit is installed, operates to fix the position of the nut laterally with respect to the basket. For many kinds of uses, it is desirable for the nut to have a certain amount of lateral play in any direction in order to permit the nut to center itself within the confines of the basket with respect to a screw or bolt which may not be exactly centered relative to the aperture in the plate to which the basket is fixed. The present form of unit permits of lateral movement between the nut and basket since after the nut has been moved to installed position in which the fingers have snapped up over the tops of the flats of the nut, the nut is then free to move laterally in the basket provided the basket is formed with suitable clearance between the arms at the sides of the basket and the retaining tabs at the ends. When such clearance is provided, as is indicated at 456, the nut may be said to float in the basket, it being understood of course, that the amount of the clearance provided in order to permit the nut to float in the basket is limited to an extent which will not permit the nut to rotate between the retaining arms.

In some cases it may be desirable to attach a basket to a plate or other body of material, the hardness of which is only slightly less than that of the material of which the basket is made, and in Figs. 45 through 52 there is shown an embodiment particularly suitable for attachment to bodies of relatively hard material, as for example heat treated aluminum alloys. In this embodiment, the blank has a base portion 502 from which extend wings 504 having fingers 508, and end tabs 522, as previously described. In the present instance the blank is first punched to provide a central aperture 518 shaped to provide six equi-distantly spaced recesses separated by sharp points 521. Radially outwardly from each of these points a small hole 558 is punched and after these holes have been formed the base is slit along the lines 519 by a shearing operation. This results in the formation of six tabs 520 each of which has at its free end a pair of spaced sharply pointed feet 120a. As seen in Fig. 46, the tabs are bent so that their root portions form a frusto-conical surface 550 as previously described in connection with Fig. 40. In this instance, however, the leg portions are convexly curved in vertical plane as shown at 554, the feet 120a being sheared by a punch 534 as previously described.

The tabs are then bent by a subsequent forming operation to the form shown in Fig. 47 by means of a suitable die 560 and punch 562.

Fig. 48 shows in plan view the shape of the tabs in the intermediate state shown in Fig. 46 and Fig. 49 shows in plan view the finished form of the basket with the hooks corresponding to the form shown in Fig. 47. From Fig. 49 it will be seen that the feet at the ends of the tabs curve radially outwardly.

In Fig. 50, a unit consisting of the basket and a skirtless hex nut 14a is shown in position to be attached to plate 12a and in Fig. 51 the unit is shown in installed position. As will be seen from Fig. 51, the sharply pointed feet are forced into the wall of the aperture 64a at a downwardly sloping angle, this form of attachment being effected by making the hooks sufficiently strong so that when the downward force for attaching the basket is transmitted through the nut the prongs 548 penetrate plate 12a so that the basket is seated or substantially seated before the frusto-conical roots 550 of the hooks bend to force the feet outwardly into the material of the plate.

In some instances it may be desirable to cause the feet of the hooks to penetrate the wall of the aperture in more directly radially outward direction so that they assume the final position indicated in Fig. 52. This is readily accomplished by proper selection of the size of the holes 558. The larger these holes are made the weaker become the sections at the roots of the tabs 520 and consequently the hooks will bend at their roots upon the application of less force than if holes 558 were smaller. Thus, with relatively large holes 558 and consequently weak sections at the roots of the hooks, bending of the hooks to force the feet outwardly may be made to occur before sufficient force has been applied to the nut to force the prongs 548 very far into the surface of the plate. Only a small amount of bending of the hooks is sufficient to cause the feet 120a to engage the wall of the aperture, such engagement taking place under the assumed conditions before the base of the basket has been seated on the surface of the plate. The further downward movement of the basket, in order to seat itself on the plate, after the points of the feet have engaged the wall of the aperture, in conjunction with the further bending action incident to the flattening out of the frusto-conical portions of the tabs, will operate to cause the feet to dig into the wall of the aperture while at the same time bending upwardly to a position such as is shown in Fig. 52.

It will thus be seen that the amount of force required to bend the hooks outwardly can readily be varied so that any desired relation, between this force and the force required to cause penetration of the prongs 548, can be secured. From this it follows that by proper selection of dimensions the penetration of prongs and the feet can be made to occur in sequence, or more or less simultaneously, as desired.

It will be apparent that in this form of the basket, a large number, in this case 12, of very sharply pointed feet can be provided, which are capable of penetrating material which is not a great deal softer than the material of which the feet are made. Even though individual feet are quite small and the extent of the penetration not great, the number of feet which it is possible to employ is such that the total holding power is sufficient to retain the basket against axial displacement by any force less than that required to tear the feet through the metal of the body to which the basket is attached.

In the various drawings herein referred to, the scale is substantially larger than many of the units actually used. Such units are of particular utility in small sizes wherein for example the basket member may be made of sheet steel as thin as .020 inch, with the hooks short enough to engage the aperture wall of sheets as thin as .025–.040 inch. While in all cases it is desirable that the feet penetrate the wall of the aperture it will be clear that an effective attachment can be made even if the sheet is so thin that the feet project partially or wholly on the reverse side of the sheet. In such cases the resistance of the feet to torque on the unit is diminished, which is undesirable.

From the foregoing description of numerous embodiments it will be apparent that many different specific forms of devices embodying the various features of the invention in different combinations, and in certain instances using some of such features to the exclusion of others, may be produced within the scope of the invention, which is to be understood as embracing all forms of devices falling within the purview of the appended claims.

What is claimed is:

1. A basket member for attaching a fastening element to a body having an aperture, said member including means engaging said element to hold it in assembled relation with the basket member, means for penetrating the wall of said aperture to hold the basket member in assembled relation with said body and means for penetrating engagement with the surface of said body to restrain the basket member against rotation.

2. A basket member for attaching a fastening element to an apertured body of material softer than that of the basket member, said member including an apertured base portion for engaging the surface of said body, prong portions projecting downwardly from said base portion for penetrating engagement with the surface of said body, additional downwardly projecting portions having their free ends positioned to substantially engage the wall of an aperture in said body when inserted therein, whereby to guide said basket member and center the aperture in the base portion thereof with respect to the aperture in said body before said prong portions engage the surface of said body, and portions projecting upwardly from said base portion for holding a fastening element in assembled relation with said basket member.

3. A basket member for attaching a fastening element to an apertured body of material softer than that of the basket member, said member including an apertured base portion for engaging the surface of said body, means for engaging and penetrating the surface of said body to restrain said member against turning relative to said body, means for engaging and penetrating the wall of an aperture in said body to restrain said member against axial displacement from said body and means for engaging a fastening element to hold it in assembled relation with said member.

4. A basket member for holding a nut having a polygonal body portion comprising a base portion, and a plurality of spaced resilient arms projecting upwardly from said base portion, said arms having inturned notched fingers to grippingly engage between them the corners formed by the intersections of a plurality of the flats of said body portion when the nut is inserted between said arms.

5. A basket member for holding a nut having a polygonal body portion comprising a base portion and resilient arms at opposite sides of said base portion, said arms carrying spaced fingers located in confronting relation and said fingers being notched to grippingly engage between them the corners formed by the intersections of a plurality of the flats of said body portion when the nut is inserted between said arms.

6. A basket member for holding a nut having a hexagonal body portion comprising a base portion and parallel resilient arms at opposite sides of said base portion carrying spaced confronting fingers at their free ends, said fingers being notched to engage the flats of said body when the latter is located between the arms with certain of its flats parallel with said arms and said arms being recessed to permit the nut to be inserted to a limited extent between said arms in a different position of rotation in which corner portions of said body overlie the recesses in said arms, said arms being resilient and adapted to be flexed outwardly by said body when the latter is turned from its inserted position to the first mentioned position in which the flats are engaged by the notches in said fingers.

7. A basket member for holding a nut having a hexagonal body portion comprising a base portion and three equidistantly spaced resilient arms carrying spaced confronting fingers at their free ends, said fingers being notched to engage the flats of said body when the latter is located between the arms with certain of its flats parallel with said arms and said arms being recessed to permit the nut to be inserted to a limited extent between said arms in a different position of rotation in which corner portions of said body overlie the recesses in said arms, said arms being resilient and adapted to be flexed outwardly by said body when the latter is turned from its inserted position to the first mentioned position in which the flats are engaged by the notches in said fingers.

8. A basket member including a base portion having an aperture, retaining portions extending upwardly from the base portion for holding a fastening element, and a plurality of hooks extending from the periphery of said aperture, the root portions of said hooks being bent upwardly from the plane of said base portion and the leg portions of said hooks being bent downwardly to depend below the plane of said base portion, whereby to provide portions adapted to move outwardly for engagement with the wall of an aperture in a body to which said member is to be attached when the root portions of said hooks are bent down into the plane of said base portion.

9. A basket member as set forth in claim 8, in which the envelope of the upwardly bent root portions of said hooks is a frusto-conical surface.

10. A basket member of the character described comprising a base portion, means including an arm portion bent upwardly from the plane of the base portion for engagement with a fastening element in the basket and a prong constituting a continuation of said arm portion projecting downwardly below the plane of said base portion.

11. A sheet metal blank adapted to be formed into a basket member for attaching a nut or the like to a body of softer material, comprising a plate having a central base portion, wing portions extending from opposite sides of said base portion, the outer edge of each wing portion being centrally recessed to provide on each wing two spaced projecting corners, said wings being adapted to be bent upwardly from said base portion to provide resilient arms and said corners being adapted to be bent inwardly over said base portion to provide spaced confronting fingers for gripping a nut between them at a plurality of spaced places, said base portion having a centrally located bridge with an aperture at each side thereof and said bridge being adapted to be transversely parted to provide two legs adapted to be bent down to form hooks depending from the perimeter of a central opening formed by the merging of said apertures.

12. A sheet metal blank adapted to be formed into a basket member for attaching a nut or the like to a body of softer material, comprising a base portion having extending triangular sharp corners adapted to be bent down to form prongs for penetrating engagement with said body, a centrally located bridge having an aperture at each side thereof, said bridge being adapted to be transversely parted to provide two legs adapted to be bent downwardly from the perimeter of the opening formed by the merging of said apertures, and wing portions at opposite sides of said base portions adapted to be bent upwardly and shaped to form arms for holding a nut in position over said opening.

13. A fastening unit comprising, in combination, a basket member and a fastening element, said basket member having resilient arms providing inturned fingers for gripping said element between them, said element having a body portion of non-circular perimeter, said fingers being spaced to permit said body portion to be inserted therebetween in a first position of rotation relative to the basket member in which the minor diameter of the non-circular body portion is between said fingers and the non-circular perimeter of said body portion engaging and spreading said fingers to flex said arms when turned to a second position of rotation in which the major diameter of the non-circular body portion is between said fingers, whereby to hold the parts in frictionally engaged assembled relation.

14. A fastening unit comprising a basket member and a nut having a polygonal body portion, said basket member having resilient arms providing inturned fingers for gripping said nut between them, said fingers being spaced to permit the insertion of said nut between them in one position of rotation relative to said basket member and being notched to engage a plurality of the flats of said body portion in a second position of rotation in which said arms are flexed away from each other to cause said fingers to frictionally grip the nut between them to hold the parts in assembled relation and to restrain the nut against turning relative to said basket member.

15. A fastening unit comprising, in combination, a basket member adapted to be secured to another body, said member having a base portion and resilient arms projecting therefrom provided with inturned fingers at their free ends, and a fastening element inserted between said fingers, said element having a base adapted to seat against the base portion of said basket member and having a non-circular body portion frictionally gripped between said fingers when the base of the element is spaced from the base portion of said member, the axial extent of said body portion being such as to permit said fingers to move inwardly to overlie a portion of it when said element is moved inwardly to seat its base on the base portion of said basket member.

16. A fastening unit comprising, in combination, a basket member having an apertured base portion, hook portions depending from the periphery of the aperture adapted to be spread to engage the wall of an aperture in a body to which said member is to be secured and resilient arms provided at their free ends with inturned fingers, and a fastening element comprising a non-circular body portion having a base adapted to engage the base portion of said member and a skirt depending from said base adapted to pass through the aperture in the base portion of the basket member to spread said hook portions, said element being inserted between said arms and said body portion being frictionally gripped between said fingers with said skirt in registry with the aperture in the base portion of the basket member and with the base of said body portion spaced therefrom, the axial length of said body portion being such as to permit said fingers to move inwardly to overlie a portion of it when said element is moved inwardly to seat said base on the basket member and to cause said skirt to spread said hook portions.

17. A fastening unit comprising, in combination, a nut and a basket member adapted to be secured to a body having an opening therein, said basket member having a base portion provided with an aperture adapted to register with said opening, portions depending from the perimeter of said aperture for insertion in said opening and upwardly extending resilient arms frictionally gripping the body portion of said nut between them over said aperture, said nut having a depending skirt adapted to pass through said aperture and into said opening to spread and cause said depending portions to penetrate the wall of said opening when the nut is moved to a position in which the base of said body portion is seated against the base portion of said basket member.

18. A fastening unit comprising, in combination, a nut and a basket member adapted to be secured to a body having an opening therein, said basket member having a base portion provided with an aperture adapted to register with said opening, portions depending from the perimeter of said aperture for insertion in said opening and upwardly extending resilient arms frictionally gripping the body portion of said nut between them over said aperture, said nut having a depending skirt adapted to pass through said aperture and into said opening to spread and cause said depending portions to penetrate the wall of said opening when the nut is moved to a position in which the base of said body portion is seated against the base portion of said basket member and said arms carrying inturned fingers located to overlie parts of said body portion when the nut is moved in the latter position.

19. A basket member for attaching a fastening element to a body having an aperture, said member including a base portion and resilient spring arms yieldably engaging said element to secure it in assembled relation with said basket member and to permit it to be disassembled therefrom due to the spring action of said arms and means projecting from the side of said base portion opposite said arms for penetrating the wall of said aperture to hold the basket member in assembled relation with said body.

20. A basket member for attaching a fastening element to an apertured body of material softer than that of the basket member, said member including an apertured base portion for engaging the surface of said body, resilient arms projecting upwardly and inwardly from said base portion and overlying a portion of said element to releasably secure it in assembled relation with the basket member and to permit its removal therefrom due to the spring action of the resilient portions, and hook portions projecting downwardly from the periphery of the aperture in said base portion for penetrating the wall of an aperture in said body to hold the basket member in assembled relation therewith.

21. A basket member for attaching a fastening element to an apertured body of material softer than that of the basket member, said member including an apertured base portion for engaging the surface of said body, resilient arms projecting upwardly and inwardly from said base portion and overlying a portion of said element to releasably secure it in assembled relation with the basket member and to permit its removal therefrom due to the spring action of the resilient portions, and hook portions projecting downwardly from the periphery of the aperture in said base portion, said hook portions having outwardly projecting pointed feet at their free ends for penetrating the wall of an aperture in said body to hold the basket member in assembled relation therewith.

22. A basket member for attaching a fastening element to an apertured body of material softer than that of the basket member, said member including an apertured base portion for engaging the surface of said body, resilient arms projecting upwardly and inwardly from said base portion and overlying a portion of said element to releasably secure it in assembled relation with the basket member and to permit its removal therefrom due to the spring action of the resilient portions, and hook portions projecting downwardly from the periphery of the aperture in said base portion, said hook portions having transversely extending feet at their free ends for penetrating the wall of an aperture in said body to hold said member in assembled relation therewith.

23. A fastening unit comprising, in combination, a basket member and a nut, said member having an apertured base portion, nut retaining portions, and bent hook portions depending from said base portion at the periphery of said aperture, the roots of said hook portions being bent to project above the plane of said base portion for engagement by the base surface of said nut to spread the free ends of said hook portions outwardly for engagement with a body to which the unit is to be attached upon axial movement of the nut relative to the basket to seat the nut and thereby cause said roots to be bent into the plane of the base portion of the basket.

ROBERT LAY HALLOCK.